A. G. BLACK.
GAS CONTROLLING APPARATUS FOR AUTOMOBILES.
APPLICATION FILED JAN. 13, 1911.
1,023,003.
Patented Apr. 9, 1912.
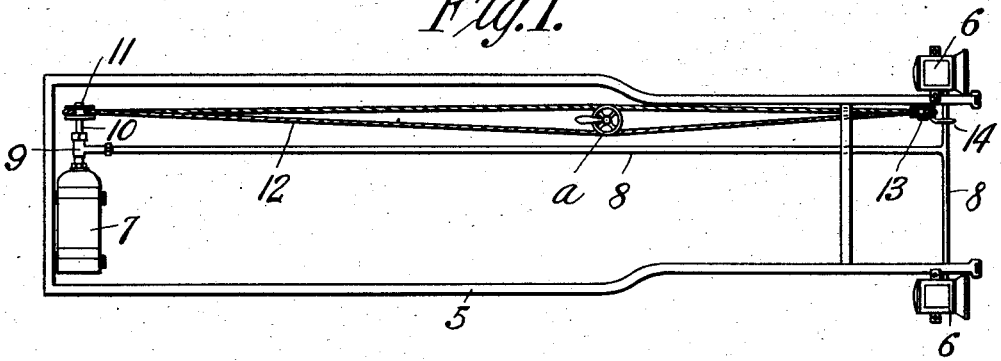
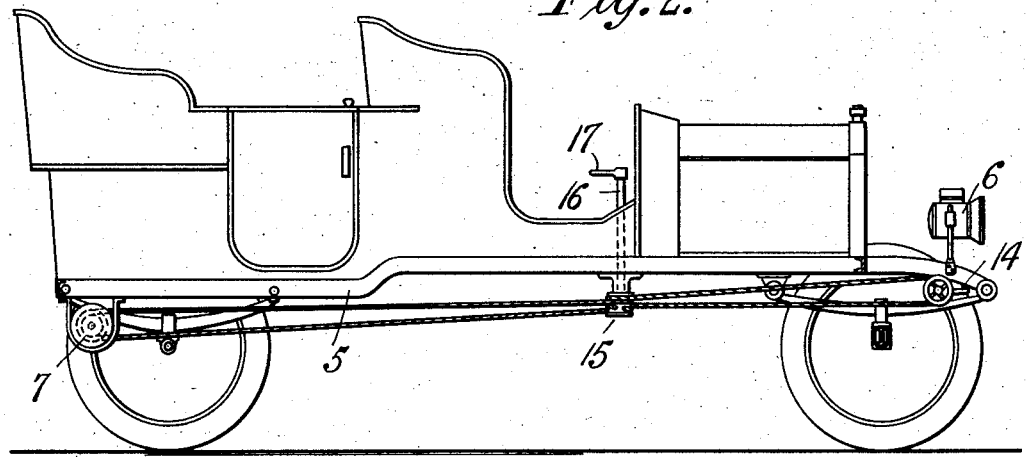
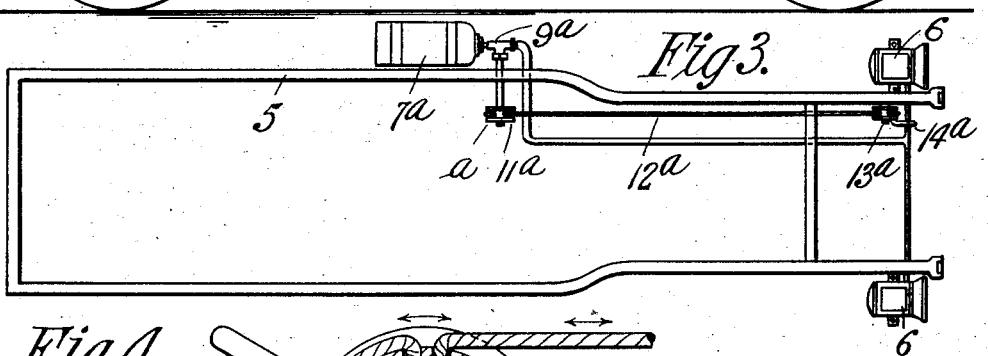
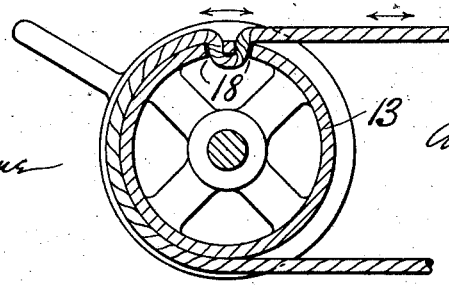
WITNESSES:
H. L. Sprague
R. M. Mowry
INVENTOR,
Allen G. Black
BY
ATTORNEY.

UNITED STATES PATENT OFFICE.

ALLEN G. BLACK, OF SPRINGFIELD, MASSACHUSETTS.

GAS-CONTROLLING APPARATUS FOR AUTOMOBILES.

1,023,003.  Specification of Letters Patent. Patented Apr. 9, 1912.

Application filed January 13, 1911. Serial No. 602,380.

*To all whom it may concern:*

Be it known that I, ALLEN G. BLACK, a citizen of the United States of America, and resident of Springfield, in the county of Hampden and State of Massachusetts, have invented certain new and useful Improvements in Gas-Controlling Apparatuses for Automobiles, of which the following is a full, clear, and exact description.

This invention relates to a gas tank valve operating device for automobiles, the object of the invention being to provide means operable either from the driver's seat or from a point adjacent the front of the automobile, for opening or closing the valve of the acetylene or other gas tank from which the lamps are usually supplied, said tank being ordinarily located at the rear of the automobile. This arrangement renders it possible for the driver to extinguish the lamps without leaving his seat and also renders it possible to turn on the gas for said lamps from the seat for ignition by any device which may be employed.

If the lamps are to be lighted with a match, this invention obviates the necessity of walking around behind the automobile to turn on the gas and then returning to the front of the machine to light the lamps. To do this, it is not only more or less trouble, but it has been found that where the gas is turned on from the rear, by the time the operator reaches the lamps to light them, they have become filled with gas to such an extent that explosions of sufficient violence to badly damage the lamps have followed the attempt to light them.

By providing an operating mechanism located adjacent the lamps, the operator is close enough to the lamps to be ready to ignite the gas as soon as it reaches them, whereby the danger of explosion from this cause is avoided.

Further objects and advantages of the invention will be set forth in the detailed description which now follows:

In the accompanying drawing, Figure 1 is a plan view of the chassis of an automobile showing the invention applied thereto, Fig. 2 is a view partly in side elevation and partly in section of an automobile, illustrating the invention, Fig. 3 is a view similar to Fig. 1, but illustrating a different disposition of the gas tank, and, Fig. 4 is a detail view of a hand wheel over which the operating cord or wire passes.

Like numerals designate corresponding parts in all of the figures of the drawing.

Referring to the drawing, the numeral 5 designates the chassis of an automobile; 6, the lamps thereof; 7, the gas tank ordinarily employed, and 8, the pipes leading from said gas tank to the lamps.

The parts so far described are of the usual and well known construction.

In carrying out the present invention, a valve 9 is employed for controlling the passage of the gas from the tank 7 to the pipe 8. The stem 10 of this valve has mounted thereon, a pulley 11 over which a cord or wire 12 passes. This cord or wire passes over a hand wheel 13 located adjacent the front lamps, this hand wheel being provided with a handle 14. Intermediate the pulley 11 and the hand wheel 13 is a horizontally disposed pulley 15 with which the cord or cable is engaged. This pulley is mounted upon a rod 16, said rod being provided with a handle 17 accessible and operable from the driver's seat.

The method of securing the cable against slipping with relation to the pulley 11 and the hand wheel 13 is illustrated in Fig. 4. By referring to this figure, it will be seen that the cord or cable is passed through openings 18 in the rim of said wheel, the sharp bends given the cord by passing them through these openings preventing slipping of the cord with relation to the rim of the wheel. It is apparent that movement of either the handle 17 or handle 14 in the proper direction will serve to either open or close the valve 9, whereby the objects hereinbefore set forth are achieved.

In Fig. 3, I have illustrated the gas tank 7$^a$ as being located at the side instead of at the rear of the automobile. The valve 9$^a$ in this figure is provided with a pulley 11$^a$ over which a cord or cable 12$^a$ passes. This cord or cable likewise passes over a hand wheel 13$^a$ that is provided with a handle 14$^a$, these parts serving the same function as those hereinbefore described.

From the foregoing description, it will be seen that simple and efficient means are herein provided for accomplishing the objects of the invention, but while the elements shown and described are well adapted to serve the purposes for which they are intended, it is to be understood that the invention is not limited to the precise construction set forth, but includes within its purview such changes as may be made within the scope of the appended claims.

It is apparent that by providing means operable from the driver's seat for controlling the valve, the lamps may be turned up or down while the vehicle is in motion. This is particularly advantageous in view of the fact that in passing through towns or villages too bright a light is objectionable for the reason that it blinds pedestrians and horses. With the controlling means accessible from the driver's seat, the lamps may be dimmed without the necessity of stopping.

Having described my invention, what I claim is:

The combination with an automobile having a lamp at its forward end, a gas supply tank having a location on the automobile to the rear of the lamp, a pipe connecting the tank with the lamp, provided with a valve having a rotative stem for operating it on which a wheel is affixed, another wheel mounted at the forward end of the automobile adjacent said lamp to be manually operated, a cord connected with both of the wheels, whereby the said gas valve may be conveniently opened and closed by a person from near the lamp, and means comprising a manually operated shaft located near the driver's seat, and operatively connected with said cord whereby the flow of gas to the lighted lamp may be diminished or shut off by a person riding in the vehicle.

Signed by me at Springfield, Mass., in presence of two subscribing witnesses.

ALLEN G. BLACK.

Witnesses:
   WM. S. BELLONT,
   G. R. DRISCOLL.

---

Copies of this patent may be obtained for five cents each, by addressing the "Commissioner of Patents, Washington, D. C."